May 9, 1939.  S. F. DUPREE, JR  2,157,597
MEANS FOR SEALING SHAFTS
Filed Aug. 27, 1936  3 Sheets-Sheet 2
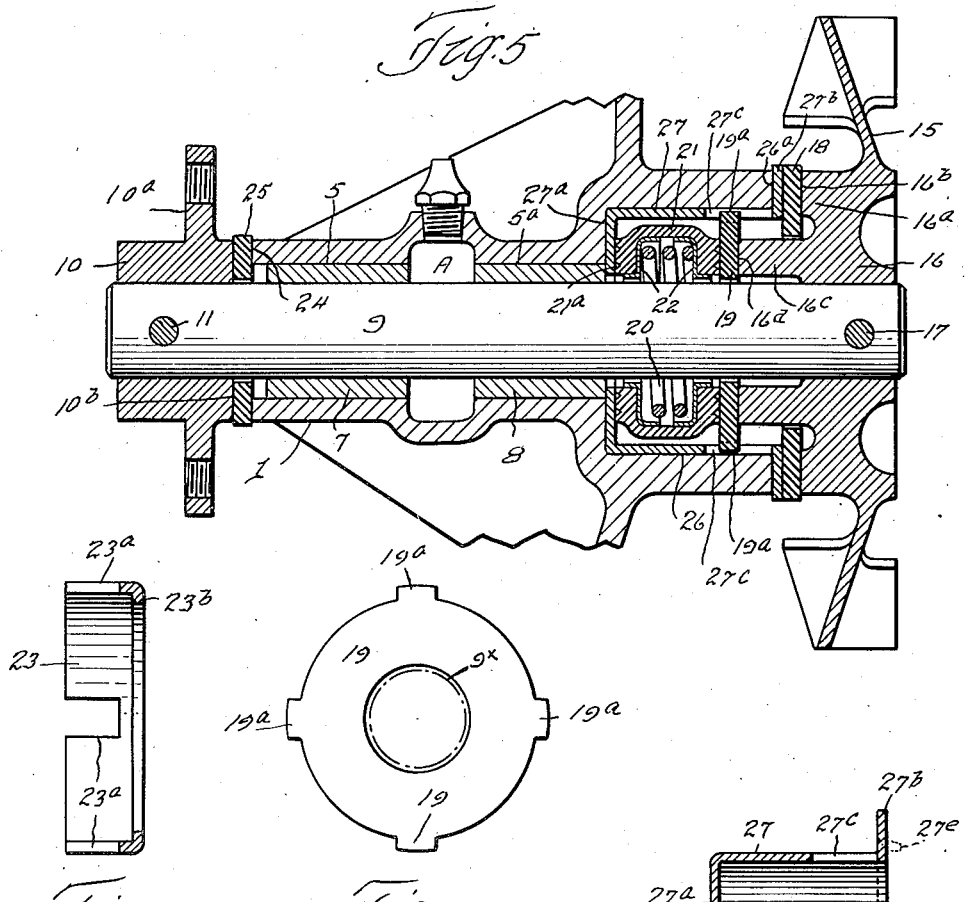
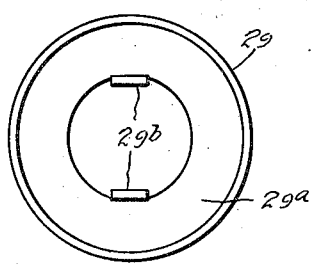
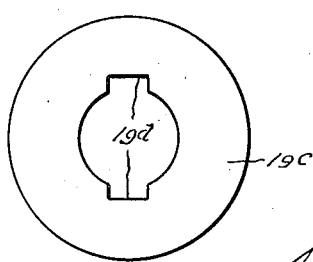
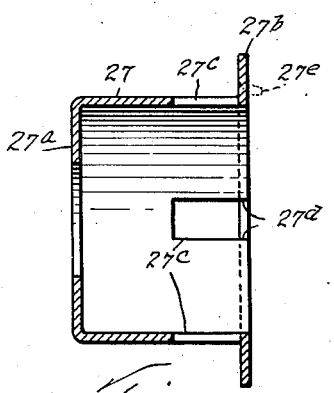
INVENTOR.
S. F. Dupree, Jr.,
BY Hull, Brock & West.
ATTORNEYS May 9, 1939.  S. F. DUPREE, JR  2,157,597
MEANS FOR SEALING SHAFTS
Filed Aug. 27, 1936  3 Sheets-Sheet 3
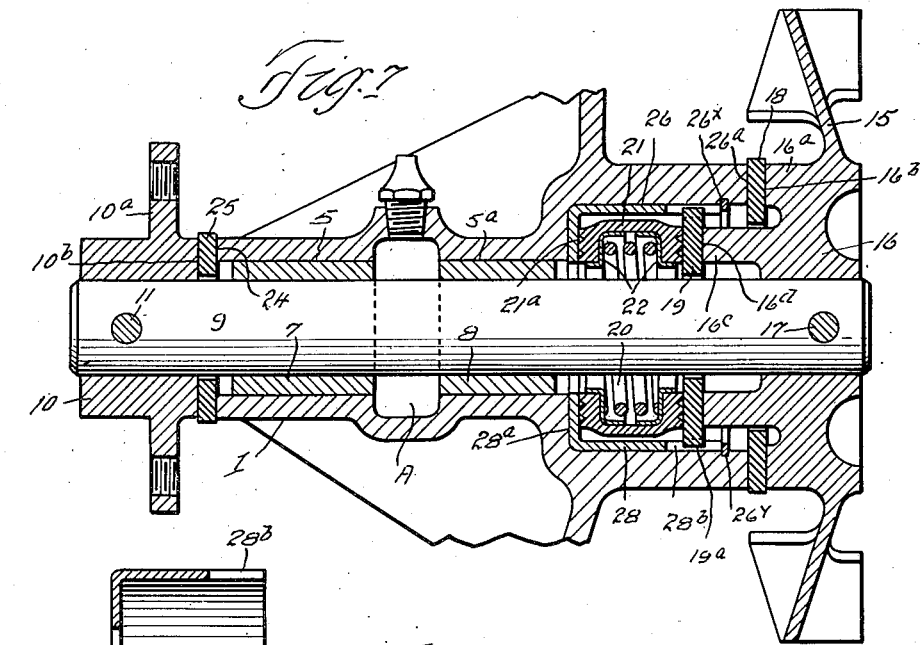
Fig. 7
Fig. 8
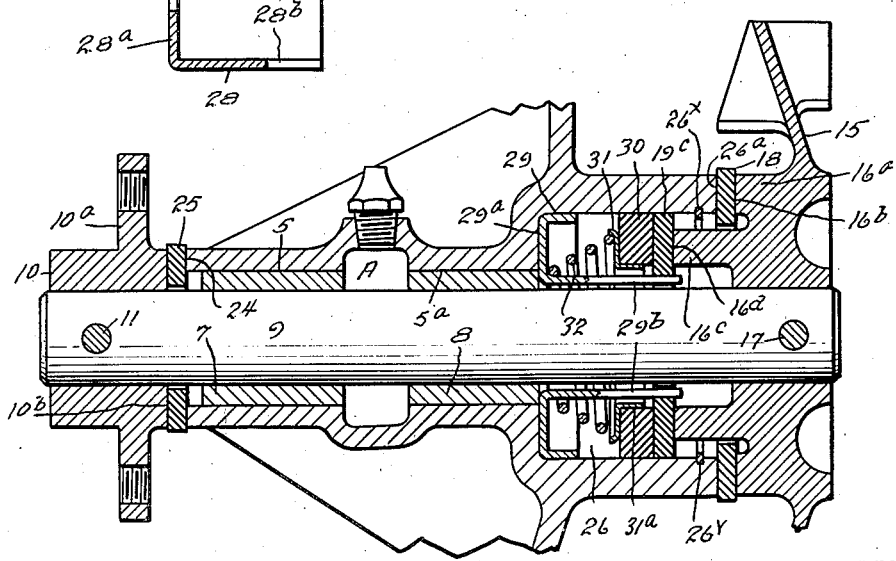
Fig. 9
INVENTOR.
S. F. Dupree, Jr.
BY
Hull, Brock & West
ATTORNEYS.

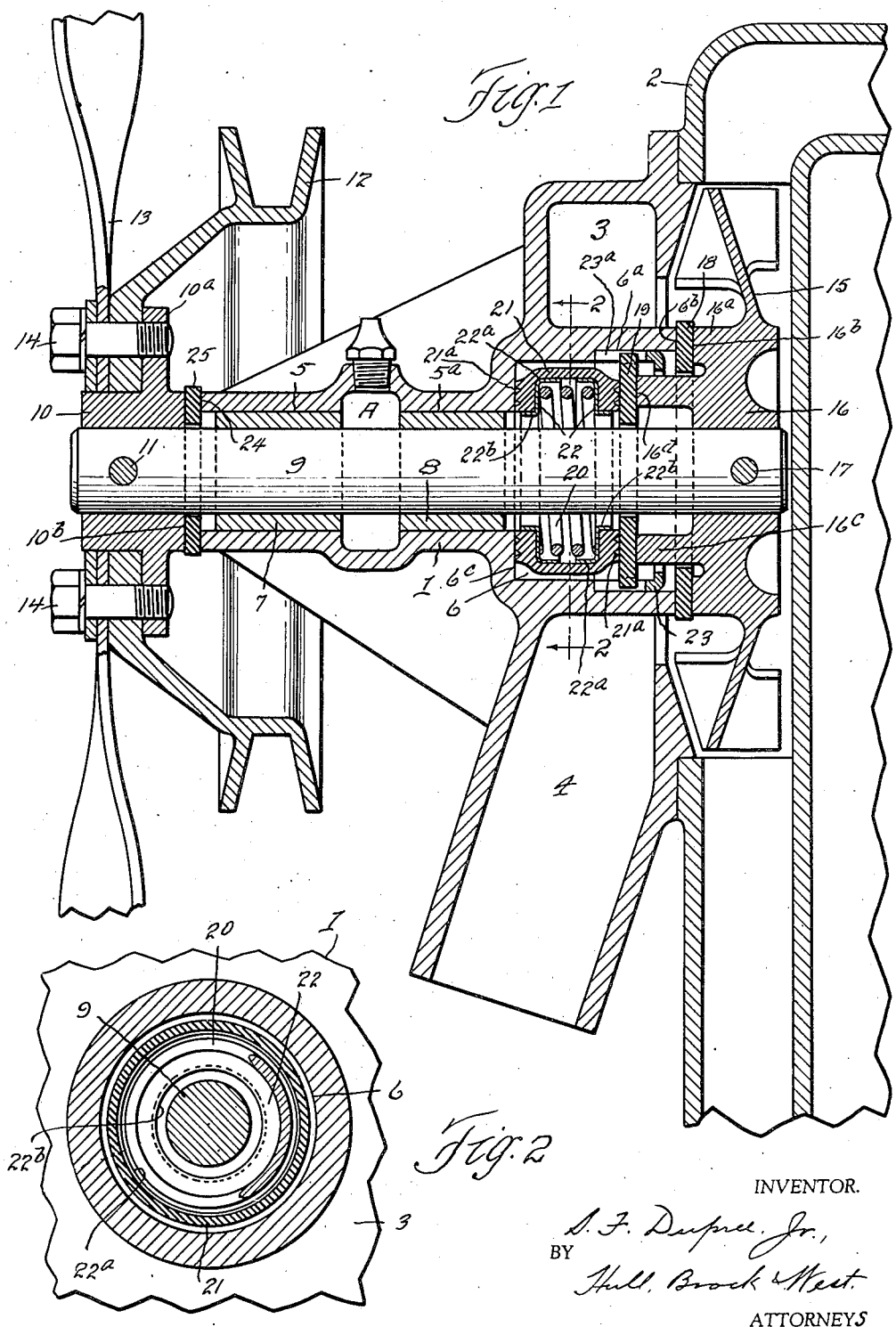

Patented May 9, 1939

2,157,597

UNITED STATES PATENT OFFICE 2,157,597

MEANS FOR SEALING SHAFTS

Samuel F. Dupree, Jr., Shaker Heights, Ohio

Application August 27, 1936, Serial No. 98,220

10 Claims. (Cl. 308—36.2)

This invention relates to means for sealing, against leakage, the shafts of pumps or similar devices used for the circulation of fluids, and has for its general object to provide sealing means, including a spring, wherein the spring will be sealed against access of fluid thereto; also to provide, with such sealing means, simple and effective means for taking up the inboard thrust imposed upon the pump shafts by the said springs and also to compensate for taking up the outboard thrust imposed upon said shafts by the fan.

A further object of the invention is to provide for such shafts sealing means that will be not only efficient in operation but economical of production.

I accomplish the foregoing objects and other and more limited objects which will appear hereinafter by means of the construction and arrangement of parts shown in the drawings hereof, wherein Fig. 1 represents a longitudinal vertical sectional view through a pump body having my invention applied thereto, the pump body being shown as applied to and used in connection with a water circulating system such as used in automobiles; Fig. 2 a detail in section corresponding to the line 2—2 of Fig. 1; Fig. 3 a detail in section through the cup or casing for the sealing ring shown in Fig. 1; Fig. 4 a view in elevation of the said ring; Fig. 5 a view, similar to Fig. 1 and showing a modified form of my invention, the connection of the pump body with the water circulating system of automobiles being omitted; Fig. 6 a detail in section through the cup or casing in which the sealing elements shown in Fig. 5 are contained; Fig. 7 a view, similar to Fig. 5, showing a further modification of my invention; Fig. 8 a detail in section through the cup or casing in which the sealing elements shown in Fig. 6 are mounted; Fig. 9 a view, similar to Figs. 5 and 7, of a further modification of my invention; Fig. 10 a detail in end elevation of the cup or casing for the sealing elements shown in Fig. 9; and Fig. 11 a detail in end elevation of the sealing ring cooperating with the cup or casing shown in Figs. 9 and 10.

Describing the various parts hereof by reference characters, and first in connection with the embodiment of my invention shown in Figs. 1-4 inclusive, 1 represents a pump body detachably secured to the wall 2 of a liquid containing chamber, which may be the water jacket of an internal combustion engine. The pump body is shown as provided with a chamber 3 communicating with the water jacket and with an outlet 4 for delivering the water to the radiator. The pump body is provided with a cylindrical bore comprising the sections 5, 5$^a$, with an annular lubricant receptacle A intermediate the said sections. At its inboard end, the cylindrical bore section 5$^a$ merges with a cylindrical chamber 6, the inboard end of which chamber is enlarged, as shown at 6$^a$, for a purpose to be explained hereinafter. The pump body is also provided with bushings 7 and 8 which are mounted in the bore sections 5, 5$^a$, and 9 denotes a shaft which is mounted in said bushings and which is provided at its outboard end with a hub 10 secured thereto by a pin 11, said hub having a flange 10$^a$ to which the pulley 12 and fan 13 are secured, as by means of screw bolts 14. 15 denotes the rotor or impeller of the pump, the same having a hub 16 which is secured to the shaft by means of a pin 17. This hub is provided with an inboard annular shoulder 16$^a$ having a sealing surface 16$^b$ and with an outboard annular shoulder 16$^c$ having a sealing surface 16$^d$, the latter shoulder being of smaller diameter than the former shoulder and surrounding the shaft and spaced therefrom.

18 denotes a thrust ring or washer which is interposed between the annular surface 16$^b$ and the annular surface 6$^b$ at the inboard end of the chamber 6, 6$^a$. This thrust ring or washer may be of carbon, or of material known to the trade as Bakelite or "Micarta".

19 denotes a sealing ring, also preferably made of Bakelite or "Micarta", which engages the annular sealing surface 16$^d$ with its inboard face, being pressed against said surface by a spring 20 located within a channeled sealing ring 21, preferably made of a deformable and resilient rubber composition known to the trade as "Duprene". The inner diameter of the sealing ring 19 is greater than the diameter of the shaft 9, as shown clearly in Figs. 1 and 4, the outer surface of the shaft being shown in the latter figure by the inner broken circle marked 9$^x$. The opposite sides of the ring 21 will preferably be corrugated, as shown at 21$^a$; and the opposite ends of the spring 20 engage radial walls 22 of casing sections the outer walls 22$^a$ of which are fitted within the web of the channel of the ring 21 while the inner cylindrical walls or flanges 22$^b$ engage the corresponding inner cylindrical walls of the "Duprene" ring, thereby to prevent the same from being forced inwardly toward the shaft by the action of the spring by their deformation against the ring 19 and the bottom 6$^c$ of the chamber in which the sealing elements are mounted. The sealing ring 19 is provided with lugs 19$^a$ adapted to be received within the slots 23$^a$ in a casing 23 which has a driving fit within the wall 6ᵃ. The interengagement of the projections 19ᵃ and the slots 23ᵃ holds the ring 19 against rotation; and the sealing elements will ordinarily be retained within the chamber 6ᵃ by the engagement of the lugs 19ᵃ with the walls defining the inboard ends of the slots 23ᵃ when the ring 19 shall not have been brought into engagement with the sealing surface 16ᵈ on the annular shoulder 16ᶜ of the rotor.

The outboard end of the pump body is shown as extending beyond the bushing 7 and as providing a shoulder having an annular sealing surface at 24 which engages the inboard face of a ring or washer 25, preferably of "Micarta" or Bakelite, the outboard face of which engages the adjacent end 10ᵇ of the hub 10.

With this construction and arrangement of parts a double seal is provided between the liquid and the spring 20, this double seal being effected by the thrust washer or ring 18 and the surfaces with which it cooperates and by the sealing ring 19 and the surfaces 21ᵃ and 16ᵈ. Should any liquid pass beyond the ring or washer 18 into the chamber 6, 6ᵃ, it cannot pass between the ring 19 and the sealing surface 16ᵈ, thereby to have access to the spring 20 through the space provided between the said ring or washer and the shaft; and the spring is protected from access of liquid thereto through the slots 23ᵃ by means of the "Duprene" sealing ring 21. It should be noted that the sealing ring 19 is held against rotation by its cage or casing 23. I have found that by holding the sealing ring 19 against rotation and by using the "Duprene" ring 21 to prevent access of liquid to the spring, I am enabled to realize definite advantages over constructions wherein the sealing ring is rotated with reference to a metallic annular sealing surface.

Inward thrust on the shaft 9 by the spring 20 will be compensated for by the thrust washer 25, while outward or outboard thrust due to the fan 13 will be compensated for by the thrust washer 18. The parts are so proportioned, constructed and arranged that, when the washers 18 and 25 are contacted on both sides, the lugs 19ᵃ of the sealing ring 19 will be approximately midway of the length of the slots 23ᵃ, thereby permitting the said ring to travel in either direction to compensate for wear upon the two thrust washers.

In Figs. 5 and 6, the parts are constructed and arranged in the same manner as shown in Figs. 1—4, with the exception that the chamber in the inboard end of the pump body, within which the sealing elements are located, is of the same diameter throughout its length, while the casing for the sealing elements consists of an inexpensive stamped cup having a radially inwardly extending flange at its outboard end constituting the bottom of the cup and a radially outwardly extending flange at its inboard end which contacts the outboard face of the thrust washer. In these views, the parts which are duplicates of those illustrated in Figs. 1—4 are designated by the same reference characters, but the fan and pulley are not shown as connected to the hub flange 10ᵃ and the pump body is not shown as connected to the water jacket of an internal combustion engine, although it will be understood that the parts thus omitted may be connected to the parts with which they cooperate in identically the same manner as they are shown in Fig. 1.

The inboard end of the pump body is provided with a cylindrical chamber 26 having an annular surface 26ᵃ at its extreme inboard end. The sealing elements 19, 20, 21 and 22 are mounted within a casing, conveniently made in the form of an inexpensive stamped cup having a cylindrical wall 27 which is press-fitted within the cylindrical wall of the chamber 26, with a radially inwardly extending bottom wall 27ᵃ surrounding and spaced from the shaft 9 and provided at its inboard end with a radially outwardly extending flange 27ᵈ which engages the annular wall 26ᵃ and the outboard face of the thrust washer 18 the inboard face of which engages the annular surface 16ᵇ.

The wall 27 of the cup or casing is provided with slots 27ᶜ for the reception of the lugs 19ᵃ on the sealing ring 19. The cuts by which the slots are formed may be extended at their inboard ends (see 27ᵈ) whereby short tongues 27ᵉ will be provided at the inboard ends of said slots, which tongues may be bent, as shown in dotted lines at 27ᵉ, to permit the insertion of the lugs into the slots after which the tongues will be bent back into the plane of the flange. The cup will serve to retain the sealing elements 19, 21 and 22 in assembled relation when the ring 19 is not engaged by the sealing surface 16ᵈ on the metallic annular shoulder 16ᶜ of the rotor. The construction shown in Figs. 5 and 6 will operate in substantially the same manner as that shown in Figs. 1–4 inclusive.

In Figs. 7 and 8 there is shown another modification of my invention, wherein certain parts are identical with those illustrated in Figs. 1 and 5 and are identified by the same numerals that are applied to these parts in the preceding views. The sealing elements 19—22 are mounted within a cup or casing having a cylindrical wall 28 which is press-fitted within the chamber 26 and having a radially inwardly directed bottom wall 28ᵃ fitting against the bottom or outboard end of the chamber 26 and being provided with slots 28ᵇ for the reception of the lugs 19ᵃ on the ring 19. In this form of my invention, the thrust ring or washer 18 is interposed between the annular surfaces 16ᵇ and 26ᵃ, in the same manner as in Fig. 1. The sealing elements 19—22 will be retained in assembled relation when the ring 19 is not engaged by the sealing surface 16ᵈ on the annular shoulder 16ᶜ of the rotor by means of an outwardly expanding split ring 26ˣ fitted within a groove 26ʸ in the wall of the chamber 26. The operation of this embodiment of my invention will be readily understood, being substantially the same as that shown in Figs. 1-4 inclusive.

In Figs. 9—11 there is illustrated a further modification of my invention, wherein certain parts which appear in the preceding views are duplicated and are identified by the same reference characters that are employed in the preceding views. The chamber 26 contains the sealing elements, said elements comprising the ring 19ᶜ, which is substantially identical with the rings 19 referred to hereinbefore, but which is provided with slots 19ᵈ extending radially outwardly from the interior thereof and adapted to receive retaining lugs 29ᵇ extending from the inner periphery of the radially extending wall 29ᵃ of a cup or casing having an outer cylindrical wall 29 which is press-fitted within the chamber 26. The ring 19ᶜ is forced against the sealing surface 16ᵈ on the inner annular shoulder of the rotor by means of the ring 30, which may be of any desirable deformable and resilient material such as "Duprene", cork or "Garlock", by means of the angular ring 31 and the spring 32. The inner cylindrical wall 31ª of the ring 31 extends within the inner cylindrical wall of the ring 30, thereby to prevent the latter from being pressed inwardly to an undesirable extent. Adjacent to its inboard end, the chamber 26 is provided with the outwardly expansible snap ring 26ˣ seated in a groove 26ʸ thereby to retain all of the sealing elements within the housing when the shoulder 16ᶜ of the rotor is out of engagement with the ring 19ᶜ.

By the construction and arrangement of parts shown and described herein, I have produced means for sealing shafts of pumps or similar mechanism against the leakage of the gases or liquids impelled or compressed thereby and for protecting the spring members of these sealing elements from deterioration by access of fluids thereto. I have also provided a simple and efficient means for compensating for longitudinal thrusts imposed upon the shaft; and I have accomplished the foregoing objects by constructions which are simple, efficient, and economical of production.

The detailed construction of the channeled sealing ring 21, with the spring 20 and retaining members or cups 22 therein, is claimed per se in my application Serial No. 103,757, filed October 2, 1936, but in an environment different from that which is shown, described and claimed herein.

Having thus described my invention, what I claim is:

1. The combination, with a body having a bore therethrough, of a shaft mounted in said bore, the said body having a chamber at its inboard end, a rotatable element on the inboard end of said shaft, the rotatable element having an outer annular shoulder, a thrust ring interposed between an annular surface provided on the outboard end of said shoulder and an annular surface on an adjacent portion of the wall of said chamber, the said rotatable element also having an inner annular shoulder projecting into the said chamber, sealing elements within the said chamber and comprising a sealing ring adapted to engage the annular surface of the second shoulder with its inboard face, a second sealing ring having a portion thereof in engagement with the outboard face of the first mentioned sealing ring, a spring operating to press the said portion of the second sealing ring against the first mentioned sealing ring, the said sealing rings surrounding and spaced from the shaft, means within the said chamber for holding the first mentioned sealing ring against rotation, and a thrust ring interposed between an outboard portion of the pump body and a member secured to and rotatable with the outboard portion of said shaft.

2. In the combination recited in claim 1, the means for holding the first sealing ring against rotation permitting movement of said ring longitudinally of said chamber, thereby to compensate for the wear on the thrust rings.

3. In the combination recited in claim 1, the chamber being provided with means for retaining the sealing elements within the chamber when the sealing ring is not engaged by the cooperating shoulder on the rotor.

4. The combination, with a body having a bore therethrough, of a shaft mounted in said bore, the said body having a chamber at its inboard end, a rotatable element on the inboard end of said shaft, the said rotatable element having an outer annular shoulder provided with an annular sealing surface at its outboard end and an inner annular shoulder extending beyond the first mentioned shoulder in an outboard direction and having an annular sealing surface at its outboard end, a thrust ring interposed between the first mentioned shoulder and the inboard end of the wall of said chamber, a casing within the said chamber, the said casing having one or more longitudinal slots therein, a sealing ring surrounding and spaced from the shaft and having a projection entering the slot or slots in said casing, a deformable and resilient ring within said chamber and having a portion in engagement with the outboard face of the sealing ring, a spring within said chamber for forcing the aforesaid portion of the deformable and resilient ring against the sealing ring, a member secured to the outboard portion of said shaft, and a thrust ring interposed between said member and the outboard end of the said body.

5. The combination, with a body having a bore therethrough and an enlarged chamber at the inboard end of said bore, of a shaft mounted in said bore, a rotatable element secured to the inboard end of said shaft and having an annular shoulder surrounding and spaced from said shaft and projecting into said chamber, a casing mounted within the said chamber against rotation, a sealing ring within said casing, the said ring having one or more exterior lugs mounted within a longitudinal slot or slots provided therefor in said casing whereby the said ring is held against rotation but is permitted a sliding movement longitudinally of the chamber, a spring within the chamber and serving to press the inboard face of the said ring against the sealing surface provided at the outboard end of said shoulder, the said rotatable element having an annular shoulder located externally of the first mentioned shoulder, a thrust ring interposed between the last mentioned shoulder and an adjacent portion of the body, and a thrust ring interposed between an outboard portion of the pump body and a member secured to and rotatable with the shaft.

6. The combination, with a body having a bore therethrough and an enlarged chamber at the inboard end of said bore, of a shaft mounted in said bore, a rotatable element secured to the inboard end of said shaft and having an annular shoulder surrounding and spaced from the shaft and projecting into said chamber, a casing fitted within the cylindrical wall of the said chamber and having a radially outwardly projecting flange at its inboard end extending across the end of said chamber, the said casing being provided with one or more slots extending longitudinally in an outboard direction from said flange, a sealing ring surrounding and spaced from the shaft and having one or more exterior lugs adapted to enter the slot or slots in the said casing, a ring of deformable and resilient material interposed between the said sealing ring and the bottom of the chamber, a spring pressing a portion of the second ring against the outboard face of the sealing ring, the said rotatable element having an annular shoulder located externally of the first mentioned shoulder, a thrust ring interposed between the last mentioned shoulder and an adjacent portion of the pump body, and a thrust ring interposed between an outboard portion of the body and a member secured to and rotatable with the said shaft.

7. In the combination recited in claim 6, the casing having a radially inwardly projecting flange at its outboard end and the outboard portion of the spring operatively engaging said flange.

8. The combination, with a body having a bore therethrough and an enlarged chamber at the inboard end of said bore, of a shaft mounted in said bore, the said chamber having a cylindrical wall at its outboard end and a cylindrical wall of greater diameter at its inboard end, a rotatable element having an annular shoulder surrounding and spaced from the shaft and projecting into the enlarged portion of the said chamber, a casing mounted in the second cylindrical wall of said chamber and having one or more longitudinally extending slots therein, a sealing ring surrounding the said shaft and spaced therefrom and having one or more external lugs adapted to enter the slot or slots provided in said casing, a ring of deformable and resilient material within the outboard portion of the chamber and spaced from the shaft, a spring within the chamber and forcing a portion of the last mentioned ring against the outboard face of the sealing ring of deformable and resilient material within the outboard portion of the chamber and having its flanges directed radially inwardly toward but spaced from the shaft, a spring within the said ring and forcing the flanges thereof one against the bottom of the chamber and the other against the outboard face of the sealing ring, the rotatable element being provided with an external annular shoulder, a thrust ring interposed between said shoulder and an adjacent portion of said chamber, and a thrust ring interposed between an outboard portion of the pump body and a member rotatable with said shaft.

9. The combination, with a body having a bore therethrough, of a shaft mounted in said bore, the said body having a chamber at its inboard end, a rotatable element on the inboard end of said shaft, said rotatable element having an annular shoulder surrounding the shaft and projecting into the said chamber, a sealing ring in said chamber surrounding the shaft and spaced therefrom and engaging the shoulder with the inboard face thereof, a ring of deformable and resilient material within said chamber and having a portion adapted to engage the outboard face of the sealing ring, a spring within said chamber pressing a portion of the second ring against the sealing ring, means within the said chamber engaging the sealing ring to prevent rotation thereof, and means cooperating with opposite end portions of the said body for absorbing longitudinal thrusts operating in opposite directions upon said shaft.

10. The combination, with a body having a bore therethrough and a chamber at the inboard end of said bore, of a shaft mounted within said bore and having a rotatable element at its inboard end, the said rotatable element having an annular shoulder surrounding the shaft and projecting into the said chamber, sealing elements within said chamber comprising an inboard sealing ring adapted to engage the outboard end of the said shoulder, a casing held against rotation within said chamber, the casing and the sealing ring being provided the one with one or more slots and the other with one or more projections adapted to enter said slot or slots whereby the sealing ring is held against rotation, a second ring within said chamber and surrounding the shaft and spaced therefrom, and a spring within said chamber and pressing the second ring against the first mentioned ring thereby to hold the first mentioned ring against the said shoulder, the chamber being provided with means for retaining the sealing elements therein when the sealing ring shall not be engaged by the said shoulder.

SAMUEL F. DUPREE, Jr.